United States Patent [19]

Hogan

[11] 4,057,207

[45] *Nov. 8, 1977

[54] SPACE VEHICLE MODULE

[76] Inventor: John Paul Hogan, 600 Elm St., Williamsburg, Iowa 52361

[*] Notice: The portion of the term of this patent subsequent to May 4, 1993, has been disclaimed.

[21] Appl. No.: 674,884

[22] Filed: Apr. 8, 1976

[51] Int. Cl.² .................. B64G 1/00; E04B 1/348
[52] U.S. Cl. ............................ 244/159; 52/DIG. 10
[58] Field of Search ............... 244/159, 161, 163, 158, 244/162; 52/81, DIG. 10; 46/25, 26; D12/71, 72; D25/4, 13, 32

[56] References Cited

U.S. PATENT DOCUMENTS

| 3,169,725 | 2/1965 | Berglund | 244/159 |
| 3,332,640 | 7/1967 | Nesheim | 244/159 |
| 3,632,109 | 1/1972 | Dattner | 52/DIG. 10 |
| 3,722,153 | 3/1973 | Baer | 52/81 |
| 3,953,948 | 5/1976 | Hogan | 52/DIG. 10 |

Primary Examiner—Trygve M. Blix
Assistant Examiner—Charles E. Frankfort

[57] ABSTRACT

The module, following the geometry of joined truncated icosahedra, is designed to provide, when a plurality of them are joined to form a space vehicle, at least a subsistence environment for terrestrial life, including a centrifugally induced artificial gravitational field, as well as an in-orbit base from which larger space structures can be built.

22 Claims, 26 Drawing Figures

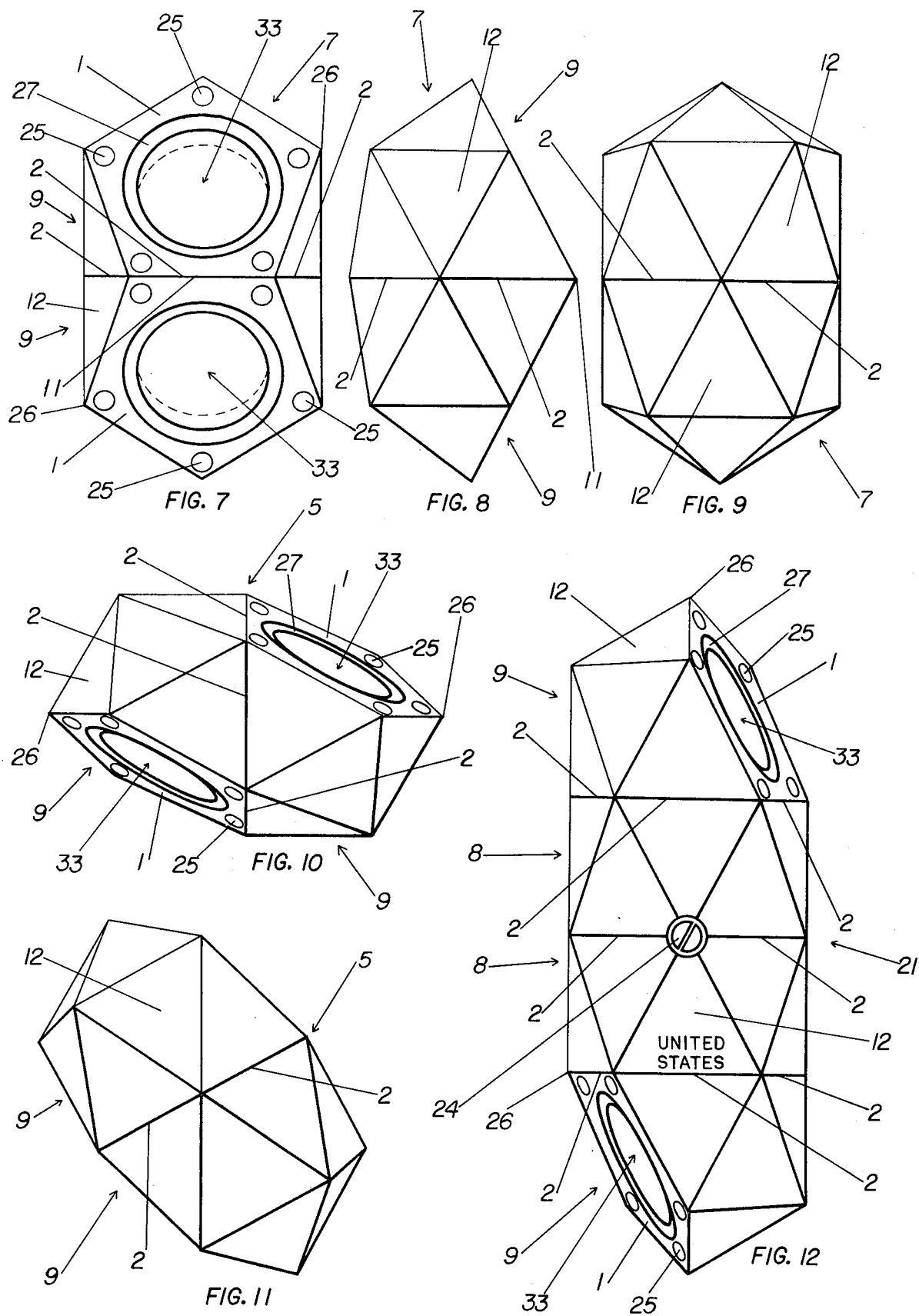

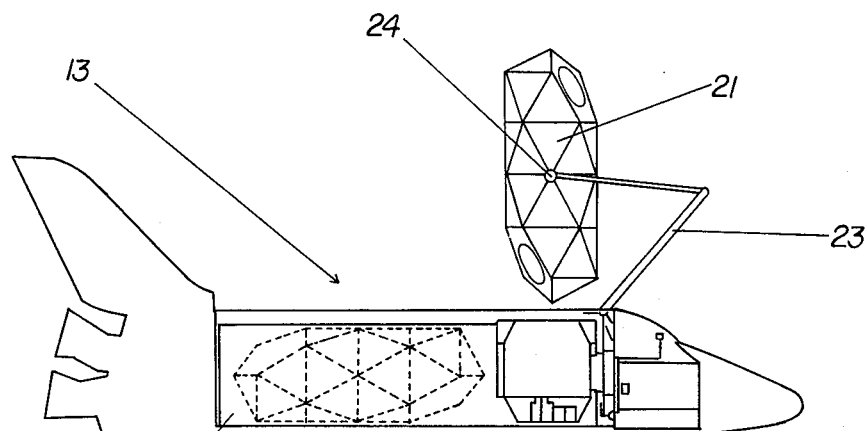
FIG. 13
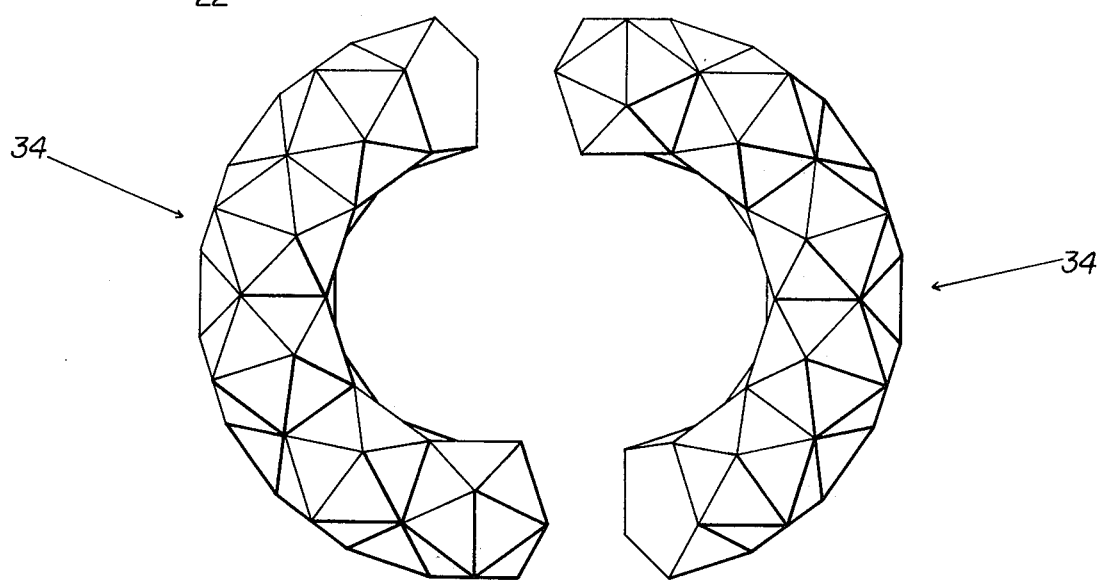
FIG. 14
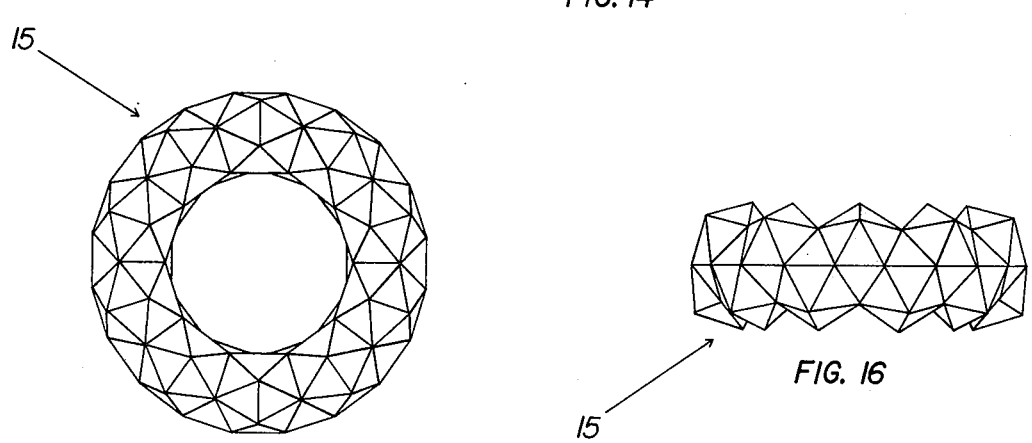
FIG. 15
FIG. 16

SPACE VEHICLE MODULE

CROSS REFERENCE AND BACKGROUND

There have been various proposals in the past as to the design of an orbiting space station. Initially space stations were designed that could be lifted into earth orbit in one shot, and then deployed out to their operational form. The generally toroidal space stations described in U.S. Pat. No. 3,144,219 and No. 3,169,725 are classic examples of this approach. The more recent Skylab is an actual example of such a one-shot space station that was put into earth orbit. Shortcomings of the one-shot system are in the severe size and weight restrictions that are placed on the space station. It must be light enough and small enough to be placed in orbit by a single rocket launch. These size and weight restrictions certainly limit not only the effective working life of a space station, due to the limit placed on exhaustible staples such as foodstuffs, respiration, energy and thrust-generating chemicals, but they also place a limit on such intangible necessities as an artificial gravitational field which will be necessary to avert any physical deterioration that can be initiated by extended periods of weightlessness. Due to its booster-sized cylindrical shape, Skylab was not intended to induce an artificial gravitational field on its inhabitants; though both toroidal space stations were designed to produce an artificial gravitational field through simple rotation, the rate of rotation would be rapid, on account of their rather short diameters. Each toroidal station would also have to rely on a rather complicated packaged structure that would have to be either inflated or mechanically erected once reaching orbit. Gas leakage, by way of micro-meteorite impacts to the inflatable sections and improperly seated gaskets and seals between the mechanically joined section that could not be corrected without disengaging all of the sections at one time, is also a potential problem.

At the other end of the design spectrum is the space station, or vehicle, which is entirely self-sufficient in supporting many forms of terrestrial life. These structures are quite large — so large that it may not be possible for them to be fabricated piecemeal on earth and then lifted, bit by bit, into earth orbit. It has been suggested, in fact, that they may have to be fabricated and assembled in orbit, with raw materials from earth's moon or the transmartian asteroid belt. These pressure tight structures, as represented in U.S. Pat. No. 3,749,332, are of generally cylindrical shape with at least one dome-like end. Gravity-like centrifugal forces are generated on the interior arcuate surface of the structure by simple rotation. It is on this interior surface where terrestrial life, both plant and animal, is cultivated and used to sustain the structure's human life using provisions of plant supporting lunar soil, atmospheric gases and water, as well as ample sunlight made available through one or more transparent surfaces. It is speculated that a number of these large structures, located at either lagrangian point L4 or L5 of the earth-moon orbital system, could become sites of significant terrestrial colonization, as well as ports from which deep space exploration could be conducted.

It would be a gross understatement to consider the building of such large structures anything less than heroic. The logistics of such a construction project would imply the existence of a permanent earth colony on the moon's surface — if the raw materials to be used in the shell construction were to be extraterrestrial. Regardless of the origin of the raw materials, at least one orbiting space station will have to be in a position to provide living quarters for the construction workers, and serve as the assembly point for both the materials and the large structure itself. Fortunately, the presence of an operational space shuttle will make the consideration of any one-shot space station system unnecessary in any such endeavor.

SUMMARY OF THE INVENTION

The space vehicle module is designed to be carried by the space shuttle to a predetermined earth orbit; there joined by a number of other space vehicle modules, they will be connected to form a pressure tight space station which will be large enough and provisioned to support a research or construction crew for an extended period of time.

Similar proposals for space shuttle dependent space station systems have been and are being made. Naturally these space stations are also modular. Generally, it is proposed that a core unit is placed in earth orbit. This core unit, an elongated cylinder in shape, would have means along its arcuate surface for the radial attachment of shuttle transported modules of a shorter and thicker cylindrical shape. These modules would not only house the station's crew, they would also enclose most of the machinery and equipment necessary to make the station operational. Such a space station would not be as short lived as a one-shot station, since individual modules can be replaced or replenished as need be by a fleet of tending shuttles; but it would resemble the Skylab-type space station in that no attempt would be made to create an artificial gravitational field. In effect, such a space station would be nothing more than a conglomeration of Skylab-type modules connected along an integrating central core unit. Quantitative improvements in the amount of both expendable and permanent supplies available would be obvious, as well as the increase in utile space. However any qualitative improvements, namely a simulated gravitational field to prevent adverse physical deterioration in the crew, would be sadly lacking.

The space station formed by the joined space vehicle modules would not be a simple conglomeration of Skylab-type modules; instead it would have a stylized helical or circular shape intended not only to generate simulated gravity upon thrust activated rotation, but perhaps even function, in the case of a helical station, as a framework upon which large space structures could be built. The structure of every space vehicle module is based on the geometry of joined, truncated icosahedra as described in my patent application No. 502,839 now U.S. Pat. No. 3,953,948; when a plurality of them are brought together, the resulting structure will conform to selected shapes possible in homohedral geometry — namely two types of rings and four varieties of helices. Structurally, each module consists of at least two joined, truncated icosahedra, the truncations occurring where up to three pentangular pyramids about non-adjacent vertices have been removed from each icosahedron; the junction occurring between two truncation surfaces, one from each icosahedron. Regardless of the number of joined icosahedra comprising any one module, there is at least one exposed pentangular truncation surface on one of the "end" icosahedra. These end truncation surfaces have alignment and docking means so that each of them can be brought to rigid physical contact with other similar truncation surfaces on other modules in up to five different positions. This flexibility in docking angles, enables one form of the module to generate more than one stylized space structure. Initially, the first modules lifted into earth orbit might be joined to form a homohedral ring or the smallest of the helices, utilizing at least ten modules in the effort. Later, when more than one station are in operation, the earlier modules can be disconnected from one another and rejoined at different angles to form a large ring, theta ring or preferably one of the larger helices, the cosmic screw or the giant screw that is based on the large ring. No other proposed or actual space station system has this capacity for a variety of structures to be generated from a few basic modules. No other system utilizes a helical configuration in its station's design, when such a configuration would not only be able to generate simulated gravity by way of rotation, but also serve as a habitable framework about which a large cylindrical space structure could be built. By being capable of these and other uses, the space vehicle module will allow for a smooth transition from the rather limited one-shot space stations of the past to the large, self-supporting and self-contained structures that will dominate the future.

BRIEF DESCRIPTION OF THE DRAWINGS

Further objects and features of this invention will become apparent from the following detailed description, when read in conjunction with the accompanying drawings in which:

FIG. 7 is a front view of a type A1 space module.
FIG. 8 is a side view of a type A1 space module.
FIG. 9 is a back view of a type A1 space module.
FIG. 10 is a front view of a type A space module.
FIG. 11 is a back view of a type A space module.
FIG. 12 is a front view of a type ABA space module.
FIG. 13 is a side view of a type ABA space module being removed from a space shuttle cargo hold.
FIG. 14 is a top perspective view of two fragments about to be joined to form a homohedral ring.
FIG. 15 is a top view of a homohedral ring.
FIG. 16 is a side view of a homohedral ring.

DESCRIPTION OF THE PREFERRED EMBODIMENTS

Figure 1:
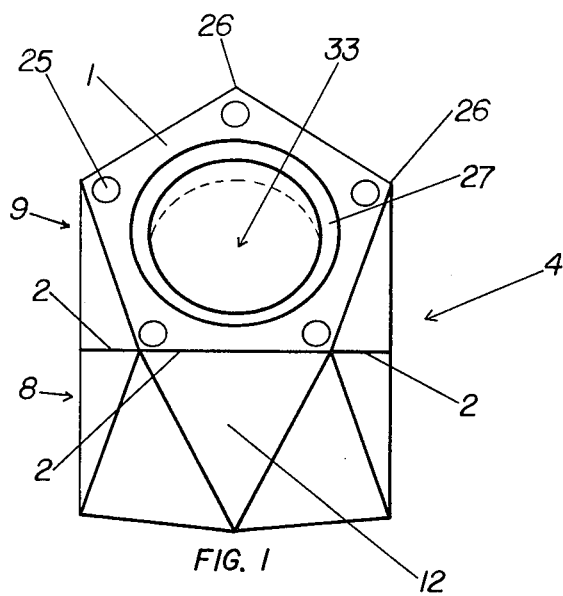
FIG. 1 is a side view of a type AB space module.
Figure 3:
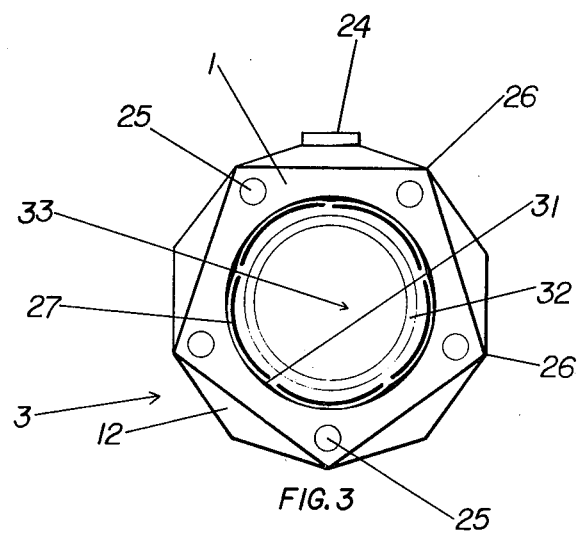
FIG. 3 is a top view of a type B space module.
Figure 2:
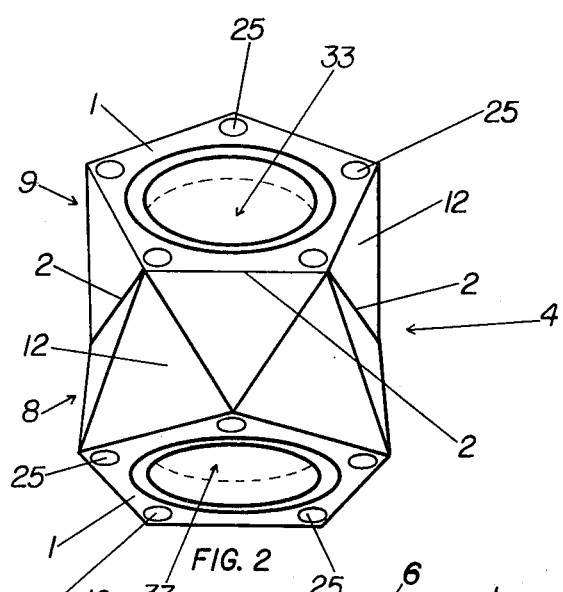
FIG. 2 is a bottom perspective view of a type AB space module.
Figure 4:
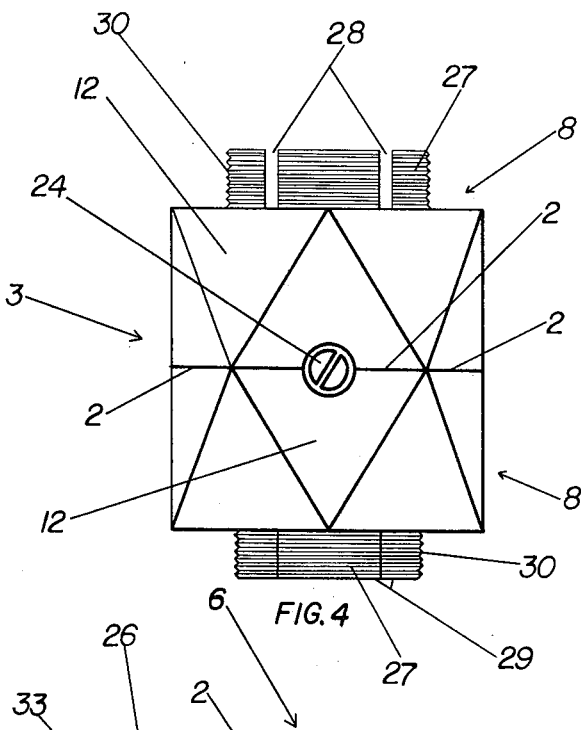
FIG. 4 is a side view of a type B space module.
Figure 5:
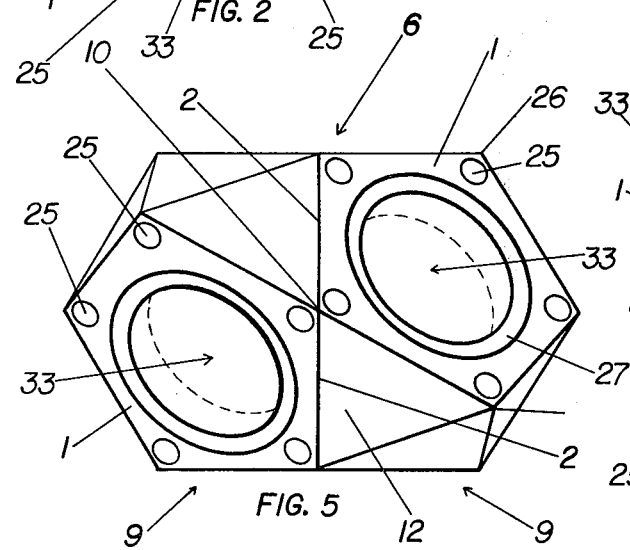
FIG. 5 is a front view of a type A0 space module.
Figure 6:
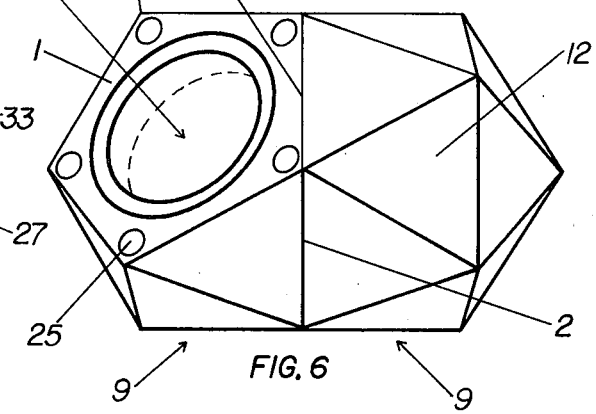
FIG. 6 is a side view of a type A0 space module.
Figure 17:
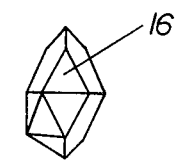
FIG. 17 is a front view of two joined, truncated icosahedra with three exposed truncation surfaces.
Figure 18:
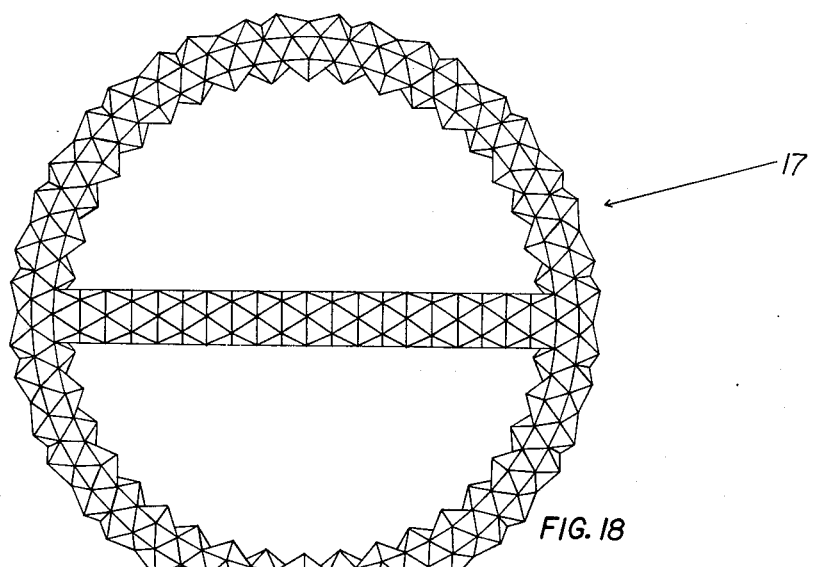
FIG. 18 is a top view of a theta ring.
Figure 20:
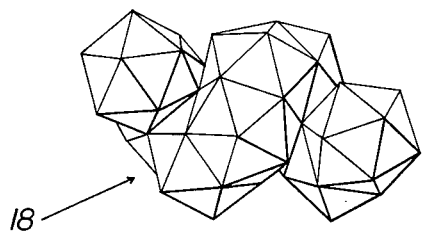
FIG. 20 is a side perspective view of a homohedral helix.
Figure 22:
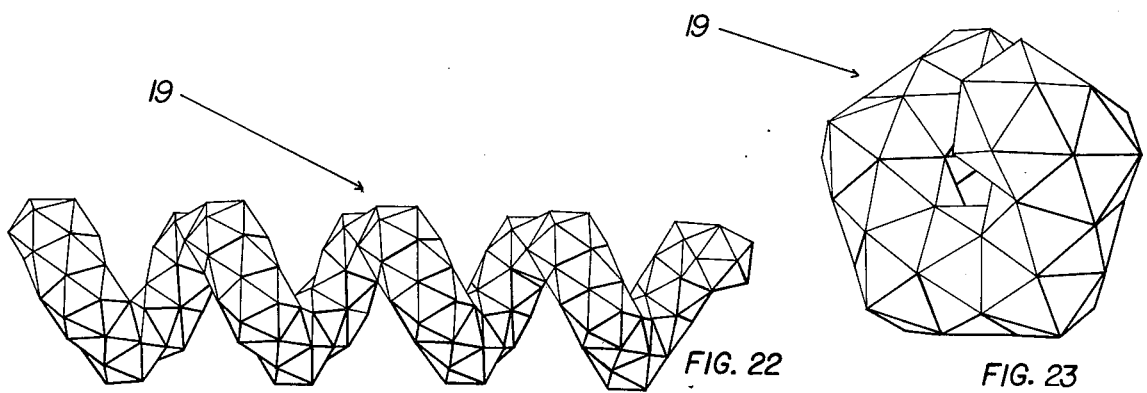
FIG. 22 is a side perspective view of a heavenly helix.
Figure 23:
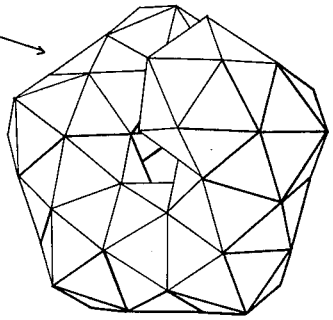
FIG. 23 is a front perspective view of a heavenly helix.

The space vehicle module of the present invention is a hollow body of generally cylindrical shape that is capable of being made pressure tight. It has at least one surface 1 designed to join with a similar surface from another module in forming a larger enclosed space, a pressure tight seal and a unique overall structure. Based on the geometry of joined, truncated icosahedra, the module's structure imitates that of at least two joined truncated icosahedra in FIGS. 1–11, where at least one icosahedra is double truncated. The truncation surfaces are formed by the removal of a pentagonal pyramid, or pentagonal pyramids about non-adjacent vertices, from the surface of an icosahedron. There are two different ways an icosahedron may be truncated about two non-adjacent vertices. A type A double truncation occurs when the two pyramids to be removed are tangent along one edge of their pentagonal bases. A type B double truncation occurs when the two pyramids to be removed are not tangent; these surfaces can be parallel, if the icosahedron upon which they occur happens to be a regular icosahedron. At least one truncation surface on each icosahedron is mated at 2 to a truncation surface on another icosahedron in forming the individual module's structure. Five genera of modules are based on two joined, double truncated icosahedra: a type B module 3 in FIGS. 3 and 4 is structurally composed of two joined type B 8 truncated icosahedra, a type AB module 4 in FIGS. 1 and 2 of two joined icosahedra — one type A 9 and one type B 8, a type A module 5 in FIGS. 10 and 11 of two type A 9 icosahedra whose exposed truncation surfaces 1 are non-tangent, a type A0 module 6 in FIGS. 5 and 6 of two type A 9 icosahedra whose exposed truncation surfaces 1 are tangent at one point 10, and a type A1 module 7 in FIGS. 7–9 of two type A 9 icosahedra whose exposed truncation surfaces 1 are linearly tangent 11. The exterior surface 12 of each of these five modules, as well as the exterior surface of other forms of the module, serve as the means by which thrust generating, communication and energy gathering devices may be affixed to the individual module. The exterior surface 12 of any one module may also be modified to provide a berthing or docking port for self-propelled space vehicles 13 in FIGS. 13 and 26 among other things, though in many instances a separate docking module 14 in FIGS. 25 and 26 will simply be attached to an available module truncation surface. Six basic homohedral structures may be assembled by using a number of these modules: ten type A modules 5 in FIGS. 10 and 11 can be joined together to form a structure similar to a homohedral ring 15 in FIGS. 15 and 16; forty type A modules 5 in FIGS. 10 and 11 can be joined to form a large ring, and if two of its opposite type A modules are replaced by modules with three truncation surfaces 16 in FIG. 17, which are in turn interconnected by ten type B modules 3 in FIGS. 3 and 4, a theta ring 17 in FIG. 18 based structure can be realized; either a number of type A0 6 in FIGS. 5 and 6 or type A1 7 in FIGS. 7–9 modules joined to one another will produce a structure with the appearance of a homohedral helix 18 in FIGS. 20 and 21; type AB modules 4 in FIGS. 1 and 2 interconnected form a structure based on the heavenly helix 19 in FIGS. 22 and 23; and a combination of alternate type A 5 in FIGS. 10 and 11 and type B 3 in FIGS. 3 and 4 modules will form a structure with the appearance of a cosmic screw 20 in FIG. 24. The three structural helices can be made to turn either clockwise or counterclockwise. This is done by simply changing the positions of the truncation surfaces 1 on the A 5 in FIGS. 10 and 11 and A0 6 in FIGS. 5 and 6 modules and the arrangement of the A1 7 in FIGS. 7-9 and AB 4 in FIGS. 1 and 2 modules in the helical structures they generate. All of these structures, both helical and circular, generate simulated gravity by simple thrust initiated rotation. Of the six structures mentioned, three of them — the large ring, the theta ring 17 in FIG. 18 and the cosmic screw 20 in FIG. 24 — provide the largest structural diameters; therefore they would be the structures of choice for any long-term, low rotation space station with simulated gravity.

Figure 21:
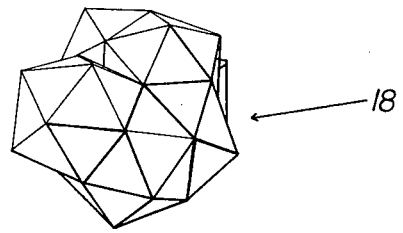
FIG. 21 is a front perspective view of a homohedral helix.

My preferred embodiment of the present invention is a type ABA module 21 in FIG. 21. Based on four joined double truncated icosahedra, the two middle icosahedra are type B 8, while the two end icosahedra are type A 9 with their exposed truncation surfaces 1 at angles to one another similar to those present on a type A module 5 in FIGS. 10 and 11. Type ABA's 21 diameter is fifteen feet or less, so it easily fits into the cargo hold of a space shuttle 22 in FIG. 13. Midway from either end are placed two means by which the module can be grasped by manipulator arms 23 on board the shuttle. These means are handles 24 to which the arms can be fixed and by which the module can be pivotly rotated in a docking movement. The exposed truncation surfaces 1 in FIGS. 1-12 have both alignment and docking means. The alignment means are five separated spots 25 of ferromagnetic material, each located close to one of the five angles 26 on the truncation surface. Since the rest of the surface 1 is either diamagnetic or weakly paramagnetic, a similar truncation surface from another module will align and attach itself properly when one or both modules electrically induce magnetism into its ferromagnetic spots 25. The docking means is a retractable five-part annular shaped device 27 in FIGS. 3 and 4 which can be laterally expanded 28 or contracted 29. Lateral ridges 30 occur on both sides of the device, which are designed to engage ridges on another module's docking device or the cylindrical wall 31 immediately within its truncation surface. When such a device is extended in and engaged to another module, so that it is reasonably fixed in relation to the inner surfaces of the other module, it can be retracted to a degree that a pressure tight seal is formed between the two modules along their annular sealing surfaces 32. The two modules can then be bolted together to ensure that the seal between them will not be inadvertently broken. The ABA modules 21 may be lifted into earth orbit either pressure tight or not pressure tight. If they are to be pressure tight, an air lock will have to be provided within each truncation surface's aperture 33. In effect, the alignment and docking means are asexual. This makes it possible to join the modules in more than one position and thus allows the individual modules a flexibility that will make their working life longer than would be expected if they were designed to be used to build only one style of station. Thrust generating, communication and energy gathering devices are affixed or incorporated onto the surface 12 of the individual modules. Docking means 14 for visiting spacecraft may be incorporated into the surface 12 of an individual module, but most likely are simply joined to an available truncation surface.

Figure 24:
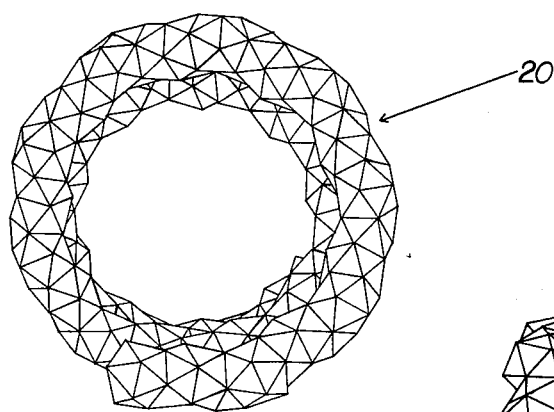
FIG. 24 is a front perspective view of a cosmic screw.
Figure 25:
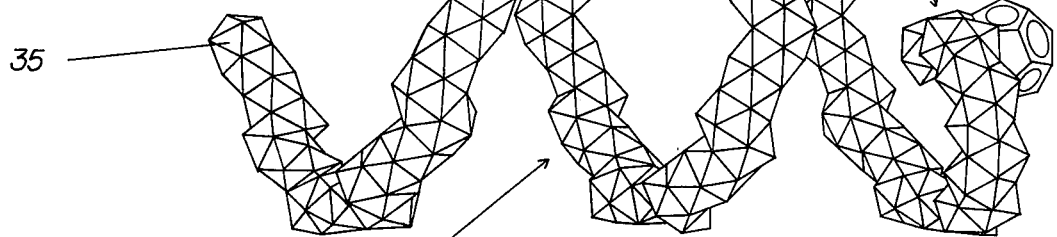
FIG. 25 is a side perspective view of a space station whose structure is derived from a cosmic screw and homohedral ring fragment.
Figure 26:
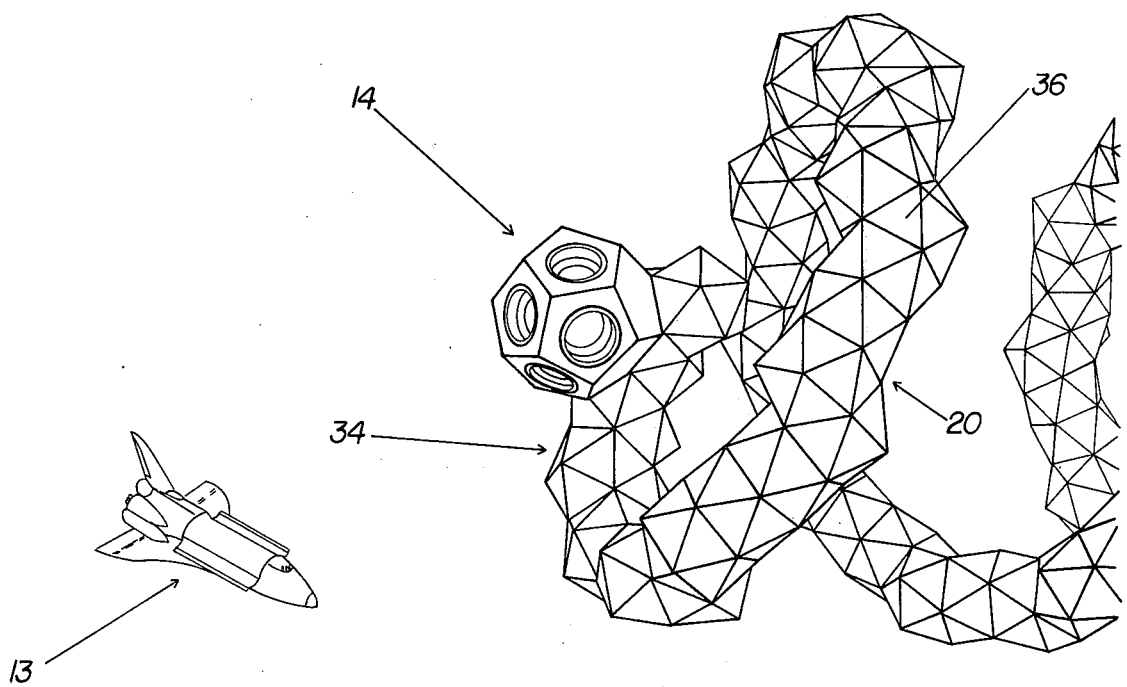
FIG. 26 is a perspective view of a space shuttle and a space station whose structure is derived from a cosmic screw and a homohedral ring fragment.

The preferred structure generated by a number of joined preferred embodiments of the module is the cosmic screw 20 in FIG. 24. It is the helix that is formed when a pair of type B icosahedra is introduced after every second icosahedra in a homohedral ring. Ten joined ABA modules 21 can produce slightly more than one complete helical cycle, though a number five to ten times that could be easily used in a permanent station of this type. Since the rotating screw will not provide an easy target for an incoming self-propelled space vehicle, a docking port 14 in FIGS. 25 and 26 is provided at one end that is positioned at the center of rotation of the screw. This is done by the inclusion of a homohedral ring fragment 34 at that end, which curves in to the center of rotation where the docking port is attached. The other end of the screw 35 in FIG. 25 may have modules added to it from time to time, which will not only add to the volume of the station, but also increase its libration and gyration stability in earth orbit. By stretching a net over the outer surfaces 36 of the screw, a drift-proof area of neutral gravitation can be provided for inhabitants of the station, where they could perform scientific experiments or routine construction work on various in-orbit projects. The outer surfaces 36 of a non-rotating screw could also be the framework upon which the shell of a large space structure could be built. Used in such a way, the screw would not only provide a solid foundation, it would also be the in-orbit workers' quarters and supply depot. By providing all of these services in just one structure, a significant cut in the expense of such an endeavor would certainly be noted.

Figure 19:
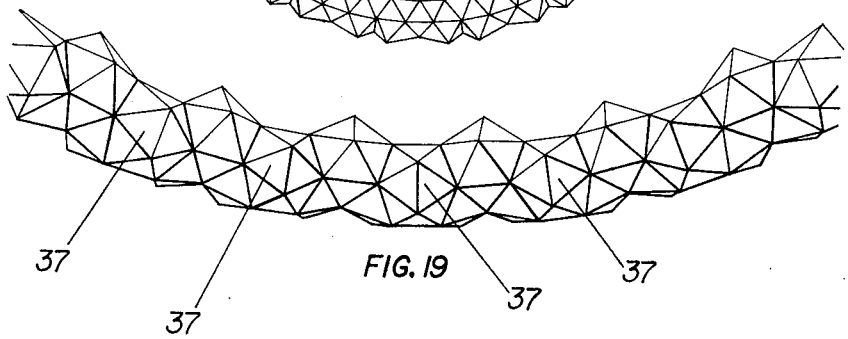
FIG. 19 is a perspective view of a portion of a theta ring.

Since the diameter of a shuttle deployed cosmic screw is less than one hundred feet, it might not be used as a large space structure's foundation. Instead a helix generated from the large ring may be used. Such a helix would form once a pair of type B icosahedra was added after every fourth icosahedra 37 in FIG. 19 in the ring. Such a helix would have a diameter considerably more than the 150 foot ideal proposed for some large space vehicles.

Though not gone into in any detail, it is assumed that the capacities of the individual space vehicle modules would be varied in accordance with the diverse needs for the sustenance of human life in orbit around the earth. It is also assumed that expendable supplies, such as foodstuffs, respiration, energy and thrust generating chemicals will be supplied to the operational station at regular intervals through docking means provided for such transfers. It should be made clear that all modules are based on either regular or irregular truncated icosahedra, while some may have cylindrical surfaces that mimic the triangulated surfaces of a module, yet retain the triangulated module's exposed truncation surfaces perfectly.

This depicture of the invention has been descriptive rather than limiting; it is understood that any modifications, substitutions or combination thereof that are within the scope of the claims have not been mentioned for the sake of brevity, obviousness or both.

I claim:

1. A space station structure designed as a vehicle through which artificial gravity and a pressure tight terrestrial environment can be provided occupants of the structure, comprised of a plurality of generally cylindrical individual modules, each module following the geometry of at least two truncated icosahedra that are joined along their truncation surfaces, the truncations occurring where a cluster of five icosahedral faces about a vertex point have been removed from the surface of an icosahedron; at least one of said icosahedra being truncated about at least two non-adjacent vertex points.

2. A space station structure as claimed in claim 1 in which said modules have manipulator arm engagement means incorporated into their non-truncated surfaces.

3. A space station structure as claimed in claim 1 in which said modules have berthing or docking means incorporated into their non-truncated surfaces.

4. A space station structure as claimed in claim 1 in which said modules have thrust generation means incorporated into their non-truncated surfaces.

5. A space station structure as claimed in claim 1 in which said modules have energy gathering means incorporated into their non-truncated surfaces.

6. A space station structure as claimed in claim 1 in which said modules have communication means incorporated into their non-truncated surfaces.

7. A space station structure as claimed in claim 1 in which said modules have means for attachment of thrust generation means to their non-truncated surfaces.

8. A space station structure as claimed in claim 1 in which said modules have means for attachment of energy gathering means to their non-truncated surfaces.

9. A space station structure as claimed in claim 1 in which said modules have means for attachment for communication means to their non-truncated surfaces.

10. A space station structure as claimed in claim 1 in which said modules have non-truncated surfaces that are arcuate.

11. A space station structure as claimed in claim 1 in which said modules are joined to one another along said truncation surfaces that form part of each module's surface.

12. A space station structure as claimed in claim 11 in which said truncation surfaces that form part of each module's surface have aligning and docking means.

13. A space station structure as claimed in claim 12 in which said aligning and docking means are magnetic and mechanical.

14. A space station structure as claimed in claim 13 in which said aligning and docking means are retractable into said modules.

15. A space station structure as claimed in claim 11 in which said truncation surfaces have apertures capable of being made pressure tight.

16. A space station structure as claimed in claim 15 in which said apertures are capable of being made pressure tight when said truncation surfaces are joined to one another.

17. A space station structure as claimed in claim 1 in which said modules are joined to form a circle.

18. A space station structure as claimed in claim 1 in which said modules are joined to form a helix.

19. A space station structure as claimed in claim 1 in which the joined modules have thrust generation means.

20. A space station structure as claimed in claim 1 in which the joined modules have means for berthing independent space vehicles.

21. A space station structure as claimed in claim 1 in which the joined modules have means to provide a drift-proof area of neutral gravitation.

22. A space station structure as claimed in claim 1 in which the joined modules provide a framework upon which a large space structure can be built.

* * * * *